United States Patent Office 2,888,426
Patented May 26, 1959

2,888,426

CERTAIN POLYEPOXIDE MODIFIED PHENOL-ALDEHYDE RESINS AND OXYALKYLATION DERIVATIVES OF SAME

Melvin De Groote, St. Louis, Kwan-Ting Shen, Brentwood, and Jen-Pu Cheng, University City, Mo., assignors to Petrolite Corporation, Wilmington, Del., a corporation of Delaware No Drawing. Original application March 9, 1954, Serial No. 415,179. Divided and this application January 24, 1957, Serial No. 635,984

5 Claims. (Cl. 260—43)

This application is a division of our copending application Serial No. 415,179, filed March 9, 1954, now abandoned.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

Our invention is further concerned with certain intermediate resinous products which subsequently are subjected to oxyalkylation and are useful for the manufacture of demulsifiers, and for other purposes. Such resinous products have utility for uses other than as a reactant in an oxyalkylation process.

Certain valuable products have been obtained by modification of phenol-aldehyde resins by means of certain polyepoxides, particularly diepoxides, followed by subsequent oxyalkylation. For instance, as an example of this type reference is made to co-pending application of De Groote and Shen, Serial No. 324,814 filed December 8, 1952, now abandoned. Said co-pending application relates to a process for breaking petroleum emulsions of the water-in-oil type characterized by subjecting the emulsions to the action of a demulsifier including synthetic hydrophile products which are oxyalkylation derivatives of the reaction products of certain alkyl phenol-aldehyde resins, therein described in detail, and certain phenolic polyepoxides, also therein described in detail.

The present invention is analogous to the invention of said aforementioned co-pending application, Serial No. 324,814, filed December 8, 1952, except that the polyepoxides employed are characterized by being hydrophobe in character although free from any radical having 5 or more uninterrupted carbon atoms in a single group.

These new polyepoxides, and particularly diepoxides, along with a method for making the same, are described in our co-pending application Serial No. 415,178, filed March 9, 1954, now U.S. Patent 2,854,461.

The present invention is concerned essentially with the modification of solvent-soluble phenol-aldehyde resins of the kind hereinafter described by means of polyepoxides and particularly diepoxides of the kind described in our co-pending application, Serial No. 415,178, filed March 9, 1954, and then subjected to oxyalkylation with monoepoxides having not over 4 carbon atoms.

Briefly stated, the polyepoxides of the kind herein employed and described in our aforementioned co-pending application, Serial No. 415,178, are characterized by a polyepoxide of the structure

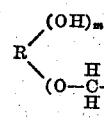

in which $m$ is a small whole number not over 4 and including O, and $m'$ is a small whole number varying from 2 to 4, and R is the residual radical of the intermediate polyol

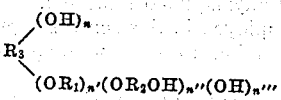

in which $n$ is a small whole number varying from 0 to 4, $OR_1$ represents oxyethylene radicals, oxypropylene radicals, and oxybutylene radicals; $OR_2OH$ represents oxy-(hydroxy)propylene radicals and oxy(hydroxy)butylene radicals; $n'$ is a numeral varying from 2 to 200; $n''$ and $n'''$ is each a numeral varying from 0 to 8; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory, polyol $R_3(OH)n_4$ in which $n_4$ is a small whole number varying from 2 to 4.

As far as the use of the herein described products goes for the purpose of resolving petroleum emulsions of the water-in-oil type, and also for that matter for numerous other purposes where surface-active materials are effective, and particularly for those uses specified elsewhere herein, we prefer to employ oxyalkylated derivatives, which are obtained by the use of mono-epoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Reference is made to U.S. Patent No. 2,499,368, dated March 7, 1950, to De Goote and Keiser. Attention is directed to that part of the text which appears in columns 28 and 29, lines 12 through 75, and lines 1 through 21, respectively. Reference is made to this test with the same force and effect as if it were here included. This, in essence, means that the preferred product for resolution of petroleum emulsions of the water-in-oil type is characterized by the fact that a fifty-fifty solution in xylene, or its equivalent, when mixed with one to three volumes of water and shaken will produce an emulsion.

Another peculiarity of the compounds herein described is that they may pass into a comparatively high molecular weight range and be effective for various purposes, not only for the resolution of petroleum emulsions but also for other industrial uses described in detail elsewhere. This characteristic may be related to the fact that the initial resin molecule, obtained in turn from two resin molecules combined by means of a polyepoxide as described, results in a fairly large molecule. We have found we can obtain compounds effective for purposes where surface-active materials are employed, whether it be the resolution of petroleum emulsions or other uses, in which one part of the derivative obtained by the polyepoxide reaction is combined with 50 parts, by weight, of the alkylene oxide, i.e., the intermediate polyepoxide derivative may contribute somewhat less than 2% of the total oxyalkylated molecule. The word "oxyalkylated" is employed in this sense for purpose of convenience in referring to the mono-epoxide derivatives only.

For purpose of convenience what is said hereinafter will be divided into seven parts:

Part 1 is concerned with general descriptive matter particularly pointing out where the herein employed polyepoxides and particularly diepoxides are inherently different from those previously employed in somewhat analogous procedures;

Part 2 is concerned with the preparation of the particular polyepoxides herein employed and it is to be noted this part, and the preceding part, are substantially as they appear in our co-pending application, Serial No. 415,178, filed March 9, 1954.

Part 3 is concerned with suitable phenol-aldehyde resins to be employed in reaction with the diepoxides;

Part 4 is concerned with reactions involving the two preceding types of materials and examples obtained by such reaction. Generally speaking, this involves nothing more than a reaction between two moles of a previously prepared phenol-aldehyde resin as described and one mole of a polyepoxide and particularly a diepoxide as herein described, so as to yield a new and larger resin molecule.

Part 5 is concerned with the oxyalkylation of the previously described resultant or cogeneric mixture which, for sake of simplicity, may be referred to as a diepoxide derived dimer. Such language is merely an approximation of its structure. Oxyalkylation is more conveniently employed in the text to indicate the use of the previously indicated monoepoxides;

Part 6 is concerned with the resultion of petroleum emulsions of the water-in-oil type by means of the previously described chemical compounds or reaction products; and Part 7 is concerned with uses for the products herein described, either as such or after modification, including uses in applications other than those involving resolution of petroleum emulsions of the water-in-oil type.

PART 1

For sake of simplicity reference will be made largely to diepoxides for the reason that such compounds are the preferred class and the most important class of the present invention. This is true also in light of ease of comparison with other available diepoxides.

At present there are available two types of diepoxides, one being a diepoxide in which there is present at least one or more hydrophobe radicals characterized by the presence of at least 5 uninterrupted carbon atoms. These materials are widely used for a variety of purposes and particularly in the preparation of epoxy resins. They are sold by at least one or more companies and are readily available in the open market. Reference is made to U.S. Patent 2,792,355, dated May 14, 1957, to De Groote et al. for a description of hydrophobe and hydrophile type diepoxides.

The hydrophile type of polyepoxide and particularly diepoxide is characterized by the freedom from any radical having at least 5 uninterrupted carbon atoms. If for convenience one characterized the hydrophobe type as the aryl type then the hydrophile type of polyepoxides, and particularly diepoxides, may be referred to as non-aryl. Such products have been described in a number of patents. More specifically, such patents are the following: Italian Patent No. 400,973, dated August 8, 1941; British Patent No. 518,057, dated December 10, 1938; U.S. Patent No. 2,070,990, dated February 16, 1937 to Gross et al.; and U.S. Patent No. 2,581,464, dated January 8, 1952 to Zech.

Of the two types of diepoxides described above, the hydrophile type may be used as a reactant for producing the diepoxides or polyepoxides useful in the present invention. In addition, a polyalkylene glycol can be employed as the initial reactant in forming the useful polyepoxides.

It is well known that there are certain polyalkylene glycols which are water-insoluble notwithstanding the fact that there is not present a hydrophobe radical having at least 8 uninterrupted carbon atoms. This does not apply to polyethylene glycols. Polyethylene glycols are water-soluble even when the undiluted material represents a hard wax-like product. This does not apply to low molal polypropylene glycols and low molal polybutylene glycols. For instance, there are available in the open market polypropylene glycols of the formula $HOCH_2(CHCH_3OCH_2)_nCHCH_3OH$ in which $n$ is 2 to 34. Polypropylene glycols having a molecular weight of approximately 150 to 425 are water-soluble. Those of molecular weight ranging from 1,000 or thereabouts to 2,000 or above, are substantially water-insoluble and will show solubility in a hydrocarbon solvent such as xylene, kerosene, or the like. An example is a polypropylene glycol having a molecular weight of approximately 600 or modestly above. The same applies to polybutylene glycol although in this instance there is some variation depending on the particular isomeric oxide from which the glycol was obtained. It goes without saying that everything else being equal the polybutylene glycols show water insolubility and oil solubility in a considerably lower molecular weight than the polypropylene glycols. It is also obvious one can obtain mixed glycols by the use of both propylene oxide and butylene oxide which will show properties somewhere between the two, depending again, at least in part, on the particular butylene oxide employed. Also it is obvious, although ethylene oxide in itself cannot be employed as a source of polyalkylene glycols it can be used in admixture provided such use does not overcome the solubility factor, i.e., does not render them water-soluble, or for some purpose does not materially decrease the solubility in a hydrocarbon solvent, such as xylene or the like. Indeed, in some instances there is a distinct advantage in reacting a small amount of ethylene oxide with a glycol which has been obtained from a higher oxide, or equivalent, i.e., propylene oxide, butylene oxide or a mixture. The reason is that reaction of the terminal radicals with ethylene oxide insures the presence of a primary hydroxyl radical.

The simplest polyol suitable for the present purpose is a diol or glycol. Such glycols are obtained hypothetically by reacting a mole of water with butylene oxide, propylene oxide or ethylene oxide so as to obtain a product which has the solubility characteristics of the kind previously specified. To a lesser degree glycide or methylglycide may be used although the limitations are obvious. Instead of starting with water one may, of course, start with any suitable reactant of the kind described or may start with a simple glycol such as ethylene glycol, butylene glycol, or propylene glycol. Actually, there are available in the open market a variety of glycols particularly polypropylene glycols or mixtures containing some ethoxy radicals which vary from approximately 600 molecular weight to perhaps as high as 7500. Such materials have been converted into ethers and used for various purposes including the resolution of petroleum emulsions. See, for example, U.S. Patent No. 2,662,859, dated December 15, 1953, to Kirkpatrick. The diols therein employed as reactants may be employed also as reactants in the present invention provided only that they meet the required solubility characteristics. Such raw materials in said U.S. Patent 2,662,859 are described as polyoxyalkylene diols wherein the major proportion of the molecular weight is attributable to oxypropylene groups (e.g., oxy 1,2-propylene) or to mixed oxyethylene and oxypropylene groups in which the weight ratio of oxyethylene to oxypropylene does not exceed 4:1. Where the oxyalkylene groups consist of oxyethylene and oxypropylene groups, the minimum molecular weight should be at least 1350 and at times as much as 2000. The best results have been obtained where the oxyalkylene groups consist of 50% to 100% by weight of oxypropylene groups. With the foregoing limitations the molecular weights of the compounds employed for the purpose of the invention are preferably within the range of 1500 to 7500.

Thus the initial reactant may be considered as a diol (obtained perhaps by reaction of an alkylene oxide and water) or any one of the other compounds described elsewhere and may be indicated by the formula $R(OH)_n$, in which R is free from any radical having more than 4 uninterrupted carbon atoms in a single group and $n$ is a numeral from 2 to 4. If such compound is then reacted with propylene oxide or butylene oxide or a mixture, or a combination of propylene oxide and ethylene oxide, or butylene oxide and ethylene oxide, the product of oxyalkylation may be indicated thus:

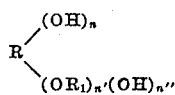

in which $OR_1$ is selected from the class of oxyethylene radicals, oxypropylene radicals, and oxybutylene radicals with the proviso that $n$ represents a numeral from 0 to 2, and $n''$ a numeral from 2 to 4, with the proviso that the sum of $n$ and $n''$ is not over 4; and with the further proviso that $n'$ is a numeral varying from 2 to 200; with the added proviso that at least part of the occurrences of $OR_1$ be selected from the class of oxypropylene, and oxybutylene radicals so that the polyol is water-insoluble and hydrocarbon soluble.

Bearing in mind that one might employ glycide or methyl glycide to a limited degree in the same way that ethylene oxide can be used to a limited degree, it is apparent that the previous formula can be rewritten thus:

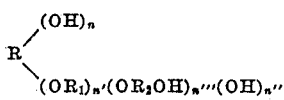

in which all the various characters have their previously mentioned significance with the proviso that $OR_2OH$ is the divalent radical corresponding to a member of the class selected from glycide, or methyl glycide, and $n'''$ is a comparatively small whole number less than 10, including 0.

In any event, having obtained a suitable glycol of the kind above described, such glycol is reacted with epichlorohydrin, or the equivalent, to yield corresponding compounds in which the terminal radical appears:

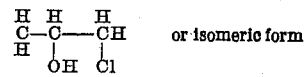

If for convenience this terminal radical is indicated by the symbol $R_2$ then it becomes obvious the two previous formulas, assuming all the hydroxyl groups are converted into the chlorine-containing derivatives may be indicated as follows:

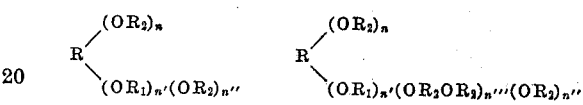

However, there is no need necessarily to convert all the hydroxyl groups provided that at least 2 are converted, i.e., that one obtains a derivative in which there are at least two groups of the radical $OR_2$. This may be indicated thus:

in which $R_3$ is the appropriate polyol residue or, more correctly, the appropriate oxyalkylated polyol residue, in which $m$ is a small whole number not over 4 and including 0, and $m'$ is a small whole number varying from 2 to 4.

The dehydrochlorination of course yields a corresponding polyepoxide which may or may not have free hydroxyls and may be indicated thus:

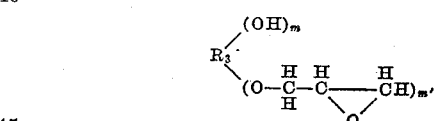

in which $m$ and $m'$ have their previous significance and $R_3$ is the residual radical of the oxyalkylated polyol,

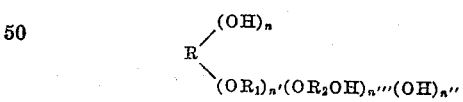

It has been pointed out previously that the present invention is not limited to diepoxides but includes polyepoxides particularly triepoxides and tetraepoxides. For instance, previous reference has been made to the treatment of certain products wtih ethylene oxide as a terminal reactant. The resultants of such reactions are still diols. However, if instead of using a mole of ethylene oxide one employs a mole of glycide the resultant product is a triol. Similarly, if 2 moles of glycide, or for that matter methylglycide, are employed, the resultant product would be a tetrahydroxylated compound. Such polyhydroxylated compounds can be reacted with epichlorhydrin or the like to yield polyepoxides.

As another illustration one may start with glycerol and react propylene oxide or butylene oxide, or a mixture, and obtain a water-insoluble triol, usually having a molecular weight of 600 or higher. Such materials can be treated with 3 moles of epichlorohydrin to yield polyepoxides.

Similarly, water soluble tetra-hydroxylated products such as pentaerythritol or acyclic diglycerol can be reacted with propylene oxide or butylene oxide or a mixture to yield a water-insoluble tetrahydroxylated compound. Such product in turn may be reacted with epichlorohydrin to yield a polyepoxide. For a number of reasons the most desirable compound is obtained from a diol and the second most desirable class appears to be obtained from triols, such as glycerol, 1,1,1-tris-(hydroxymethyl)ethane, etc.

Also, it is obvious that if one starts with a polyol having more than 2 hydroxyls then polyepoxides can be obtained in which there is at least one or possibly more residual hydroxyl radicals. Thus, oxypropylated glycerol can be reacted with 2 moles of epichlorohydrin yielding a substantial amount of a compound in which there are present 2 epichlorohydrin group residues and one hydroxyl group. As to oxyalkylated glycerol see U.S. Patent No. 2,665,312, dated January 5, 1954, so Ohlmann et al. Similarly, acyclic diglycerol will yield a comparable product having 2 or 3 epoxide radicals and 2 or one residual hydroxyl radicals. The main difficulty in the preparation of this type of compound is the tendency toward self-polymerization characteristic of comparable compounds such as glycide or methylglycide.

Previous reference has been made to the fact that the hydrophile type of polyepoxide and particularly diepoxide will be used to prepare a suitable polyol and particularly a diol which becomes the initial reactant in the present manufacturing procedure. This, however, requires explanation for the reason that obviously a water-insoluble diol or the equivalent, for instance, polypropyleneglycol having a molecular weight of approximately 600 to 700, could be reacted in a molal ratio of two moles of the glycol with one mole of a diepoxide as previously described, for instance

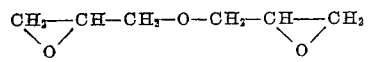

to yield a suitable tetraol which then could be reacted with epichlorohydrin. Similarly, one might use a polybutyleneglycol having a molecular weight of about 600 or a mixed glycol which had been prepared by the use of both butylene oxide and propylene oxide. Indeed, in either instance the glycol could be reacted with a small amount of ethylene oxide provided, of course, that the reaction product after combination with a hydrophile diepoxide still met the solubility requirements noted elsewhere in the text.

Where reference has been made to the use of ethylene oxide, butylene oxide, or propylene oxide, and particularly the latter, certain glycidyl ethers could be substituted such as allylglycidyl ether, isopropyl glycidyl ether, ethylene glycidyl ether, or the like.

PART 2

In addition to the other polyols which have been described as suitable reactants, attention is directed to the specific description of certain suitable polyols which appear in U.S. Patents Nos. 2,626,903, 2,626,904 and 2,626,905, all dated January 27, 1953, to De Groote, and 2,652,421, 2,652,422 and 2,652,424, all dated September 15, 1953, to De Groote.

Any desired procedure may be employed in the preparation of the present polyepoxides and particularly diepoxides. As far as the reaction with epichlorohydrin is concerned it is our preference to use boron trifluoride as a catalyst.

In the dehydrochlorination it is our preference to use either caustic soda in powder or pellet form, or in any suitable form, or to use sodium aluminate. To the extent that a solvent is required it is our preference to use isopropyl ether or dioxane as a solvent. As to patents which show these various steps but not in the preparation of diepoxides of the kind herein described, see U.S. Patents Nos. 1,446,872, dated February 27, 1923; 2,061,377, dated November 17, 1936; 2,070,990, dated February 16, 1937; 2,224,849, dated December 17, 1940; 2,248,635, dated July 8, 1941; 2,314,039, dated March 16, 1943; 2,351,025, dated June 13, 1944; and 2,538,072, dated January 16, 1951.

Any suitable procedure can be employed in the reaction involving epichlorohydrin and the selected polyol particularly a diol. Due to ready availability and low cost we prefer to use polypropyleneglycols as the reactants. Furthermore, in the use of a diol there is less opportunity for complicating reactions than when triols or tetrahydroxy compounds are used.

The following examples illustrate the condensation procedure:

*Example 1a*

3,000 grams of polypropylene glycol 1200 (2.5 moles) were mixed with 30 cc. of a 10% solution of boron fluoride in ether. This represented about 2 or 3 grams of boron fluoride. The temperature was raised to about 80° C. and held at this temperature within 3° in either direction. About 7½ moles of epichlorohydrin (699 grams) were added over a period of 4 or 5 hours. At the end of this time the reaction appeared to be complete.

Immediately following is Table I which shows in tabular form a number of other condensations conducted in the same manner as described above.

TABLE I

| Ex. No. | Polyhydroxylated compound | Grams | Moles | Epichlorohydrin Grams | Epichlorohydrin Moles | 10% BF$_3$ solution, cc. | Temp., °C. | Time, hrs. |
|---|---|---|---|---|---|---|---|---|
| 1a | Polypropylene glycol 1200 | 3,000 | 2.5 | 699 | 7.5 | 30 | 80 | 5 |
| 2a | Polypropylene glycol 400 | 600 | 1.5 | 419 | 4.5 | 9 | 80 | 3 |
| 3a | Polypropylene glycol 750 | 750 | 1.0 | 279 | 3.0 | 9 | 80 | 4 |
| 4a | Polypropylene glycol 1000 | 500 | 0.5 | 140 | 1.5 | 5 | 80 | 4 |
| 5a | Polypropylene glycol 2000 | 400 | 0.2 | 56 | 0.6 | 4 | 80 | 4 |
| 6a | Tributylene glycol | 552 | 2.0 | 556 | 6 | 10 | 85 | 4 |
| 7a | Tetrabutylene glycol | 362 | 1.0 | 279 | 3 | 5 | 85 | 4 |
| 8a | Pentabutylene glycol | 448 | 1.0 | 279 | 3 | 6 | 85 | 4 |
| 9a | Hexabutylene glycol | 534 | 1.0 | 279 | 3 | 6 | 85 | 5 |
| 10a | Heptabutylene glycol | 620 | 1.0 | 279 | 3 | 7 | 85 | 5 |
| 11a | Dimethyl tetrabutylene glycol | 306 | 1.0 | 279 | 3 | 5 | 80 | 4 |

It is to be noted that the amount of epichlorohydrin employed is greater than mole-for-mole based on the hydroxyl present in the polyhydroxylated compound. We have found this necessary to obtain a suitable yield. Thus, it well may be, and probably is true, that the number of chlorine atoms in the intermediate product is greater than one-to-one based on the hydroxyl radical. Also, it is true that in the course of dehalogenation some epichlorohydrin may be converted into a hydroxylated compound or derivative.

Having obtained the epichlorohydrin derivatives as described above, the intermediate product is subjected to dehalogenation. A number of procedures can be employed and the following illustrations will serve.

Example 1b

In this procedure the sodium aluminate method was used. Epichlorohydrin derivative Example 1a was employed as the intermediate. 1130 grams of this material were mixed with 530 grams of technical sodium aluminate, along with 111 grams of water and 1800 grams of dioxane. The mixture was stirred at room temperature for about a half hour and then heated under reflux condenser for 10 hours. The mixture refluxed at approximately 95° C. At the end of this time the reaction mass was filtered and the filter residue washed with dioxane. The filtrate was then subjected to vacuum stripping so as to remove the solvent by use of a temperature of 150° C. under 30 mm. pressure.

The epoxide value determination on the stripped residue showed approximately 2 epoxide radicals per mole, i.e., the value being 1.87 in one instance and 1.90 in the other.

The yield was 1019 grams or slightly over 93% based on the initial diol.

Example 2b

A similar experiment was related, using slightly smaller quantities, to wit, 200 grams of Intermediate Example 1b, 95 grams of sodium aluminate, 20 grams of water, and 300 grams of dioxane. The amount of product obtained was 180 grams (again a 93% yield) and the epoxide value was substantially the same as before.

Example 3b

In this procedure the caustic soda method was employed instead of using sodium aluminate. 200 grams of condensate Example 2a were mixed with 600 grams of isopropyl ether and 21 grams of caustic soda. The mixture was stirred and the temperature held at 30° C., plus or minus 5, for seven hours. The caustic soda in flake form was added in 4 portions. 40% of the caustic soda was added during the first hour, 30% during the second hour, 20% was added during the third hour, and 10% in the fourth hour. After the final addition of caustic soda the mixture was then stirred for 4 hours longer. The mixture was allowed to settle for approximately 3 days, decanted, washed with 100 grams of isopropyl ether and then filtered over 50 cc. (volume measurement) of diatomaceous earth.

The ratio of epoxide radicals per molecule were the same as in previous examples and the yield was approximately the same.

Using the same procedure, or obvious variants, a number of other intermediates were prepared which appear in Table II and are identified as Examples 1b through 13b. Note that where the solvent is designed with an (A) or (B), the (A) indicates the solvent was dioxane, and the (B) shows the solvent was isopropyl ether.

In regard to the above procedure, reference is made to the following patents which are concerned with boron fluoride as a catalyst; or dehydrochlorination procedure employing either sodium aluminate or caustic soda; and also in one instance a patent is concerned with the use of dioxane as a solvent:

| U. S. Patent No. | Date |
|---|---|
| 1,446,872 | Feb. 27, 1923 |
| 2,061,377 | Nov. 17, 1936 |
| 2,070,990 | Feb. 16, 1937 |
| 2,224,849 | Dec. 17, 1940 |
| 2,248,635 | July 8, 1941 |
| 2,314,039 | Mar. 16, 1943 |
| 2,351,025 | June 13, 1944 |
| 2,538,072 | Jan. 16, 1951 |

The products derived in the manner above described, i.e., the polyepoxides and particularly the diepoxides, are generally light colored or sometimes almost water white. The amount used in most instances is so small that this color is not objectionable. If required, however, the products could be bleached by use of filtering clays, charcoal, or the like.

PART 3

This part is concerned with the preparation of phenol-aldehyde resins of the kind described in detail in U.S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U.S. Patent No. 2,499,370, reference is made also to the following U.S. Patents: Nos. 2,499,365, 2,499,366 and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made

TABLE II

| Ex. No. | Epichlorohydrin derivatives of Ex. No. | Grams | Dehalogenation reagent | | | Temp., °C. | Time, hrs. | Solvents, grams | Yield, percent |
|---|---|---|---|---|---|---|---|---|---|
| | | | NaOH, Grams | NaAlO$_2$, Grams | H$_2$O, Grams | | | | |
| 1b | 1a | 1,130 | | 530 | 111 | 93–95 | 10 | 1,800 (A) | 93 |
| 2b | 1a | 300 | | 95 | 20 | 93–95 | 10 | 300 (A) | 93 |
| 3b | 1a | 200 | 21 | | | 30–35 | 7 | 600 (B) | 93 |
| 4b | 2a | 339 | 79 | | | 30–35 | 6 | 1,000 (B) | 90 |
| 5b | 3a | 480 | | 322 | 68 | 93–95 | 9 | 720 (A) | 92 |
| 6b | 4a | 557 | | 300 | 63 | 93–95 | 10 | 770 (A) | 93 |
| 7b | 5a | 400 | | 121 | 25 | 93–95 | 10 | 550 (A) | 92 |
| 8b | 6a | 370 | 105 | | | 30–35 | 6 | 1,100 (B) | 91 |
| 9b | 7a | 300 | 74 | | | 30–35 | 6 | 900 (B) | 89 |
| 10b | 8a | 460 | 100 | | | 30–35 | 7 | 1,400 (B) | 88 |
| 11b | 9a | 272 | 53 | | | 30–35 | 7 | 800 (B) | 90 |
| 12b | 10a | 450 | | 345 | 72 | 93–95 | 9 | 620 (A) | 91 |
| 13b | 11a | 585 | 158 | | | 30–35 | 6 | 1,700 (B) | 89 | to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U.S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature; for instance, it has been stated that the composition is approximated in an idealized form by the formula

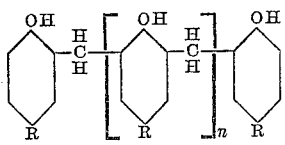

In the above formula $n$ represents a small whole number carrying from 1 to 6, 7 or 8, or more, up to probably 10 or 12 units, particularly when the resin is subjected to heating under a vacuum as described in the literature. A limited sub-genus is in the instance of low molecular weight polymers where the total number of phenolic nuclei carried from 3 to 6, i.e., $n$ varies from 1 to 4; R represents an aliphatic hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

In the above formula the aldehyde employed in the resin manufacture is formaldehyde. Actually some other aldehyde such as acetaldehyde, propionaldehyde, or butyraldehyde may be used.

As previously stated, the preparation of resins, the kind herein employed as reactants, is well known. See U.S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purpose of convenience suitable resins are characterized in the following table:

TABLE III

| Example number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 936.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 4

As previously stated, the intermediate reactions involve two moles of a phenol-aldehyde resin of the kind previously described, and one mole of a diglycidyl ether as described. The reaction is essentially an oxyalkylation but, for sake of convenience is differentiated from the subsequent oxyalkylation procedure which involves a monoepoxide only. Since the polyepoxide is nonvolatile as compared, for example, to ethylene oxide, the reaction is comparatively simple. On the other hand, purely as a matter of convenience, one generally would conduct both class of reactions in the same equipment. In other words, the two moles of phenol-aldehyde resin would be reacted with a polyepoxide and then subsequently with a mono-epoxide. In any event, the polyepoxide reaction can be conducted in an ordinary reaction vessel, such as the usual glass laboratory equipment. This is particularly true of the kind used for resin manufacture as described in a number of patents, as for example, previously mentioned U.S. Patent No. 2,499,365. One can use a variety of catalysts in connection with the polyepoxide of the same class employed with monoepoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes it is best to use a catalyst which can remain in the reaction mass and will continue to serve as a catalyst in connection with the oxyalkylation employing the monoepoxide. For this reason we have preferred to use a small amount of finely divided caustic soda or sodium methylate as a catalyst. The amount generally employed is 1%, 2%, or 3% of these alkaline catalysts.

Actually, the reactions of polyepoxides with various resin materials have been thoroughly described in the literature and the procedure is, for all purposes, the same as with glycide which is described in detail in the next succeeding part, to wit, Part 4.

The use of an excessive amount of catalyst may produce side reactions as in the case of glycide. For the sake of simplicity the procedure will be illustrated by examples but particular reference is made again to the further discussion of oxyalkylation reactions and procedures in Part 4.

It goes without saying that the reaction can take place in an inert solvent, i.e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required.

*Example 1c*

The phenol-formaldehyde resin employed was the one previously identified as Example 38aa, having a molecular weight of approximately 700; the amount employed was 1408 grams. The resin was finely powdered and 1000 grams of xylene added. The mixture was heated to approximately 92° C. and stirred until the solution was complete. 27 grams of sodium methylate were then added and stirring continued until complete solution or distribution was obtained. The mixture was heated to 80° C., 1310 grams of the diepoxide, previously identified as polyepoxide 1b were added. It was added in solution form and mixed with 1500 grams of xylene. This solution was added dropwise. Just before the addition of the diepoxide the temperature was raised to somewhat above 100° C.—near 108° C. The time required to add the diepoxide was approximately 2.25 hours. The temperature rose during this period to about 133° C. The product was then allowed to reflux at this approximate temperature for the next 2 hours. During this period there was a modest loss of xylene and the temperature rose slightly to about 135° C. Heating was then allowed to proceed for about 6 hours longer and part of the xylene was removed by means of a conventional phase-separating trap so that at the end of the period the temperature had risen to approximately 140° C. Refluxing was then continued further with the removal of a bit more xylene and at the end of this additional period the temperature had reached approximately 150° C. The overall reaction period at the higher reaction temperature, that is above 135° C., was 6 hours. Of course, part of the reaction and perhaps the bulk of the reaction took place at a lower temperature. It is probable that a considerably shorter reaction period could be used and perhaps even a lower temperature than the maximum temperature employed.

At the end of this period there was no particular residue in the reaction flask and the reaction mass was entirely homogeneous. In some instances a small amount of residue did appear but it went into solution by merely adding a bit more xylene or, in some instances, a small amount of diethyl ether of ethylene glycol was added. In all instances when the procedure was finished either enough xylene was removed or enough xylene or other solvent added so as to bring the final mixture to approximately 50% solvent and 50% reaction mass.

The procedure employed, of course, is simple in light of what has been said previously and also in light of what is said in the next section. Various examples obtained in substantially the same manner are enumerated and described in the following tables:

TABLE IV

| Ex. No. | Resin used | Resin, used, grams | Dissolved in xylene, grams | Sod. methylate used, grams | Polyepoxide used | Polyepoxide used, grams | Dissolved in xylene, grams | Reaction temp. range, ° C. | Approx. time of reaction, hrs. | Percentage solvent in final product |
|---|---|---|---|---|---|---|---|---|---|---|
| 1c | 38aa | 1,408 | 1,000 | 27 | 1b | 1,310 | 1,500 | 80-150 | 6 | 50 |
| 2c | 1aa | 1,984 | 1,000 | 25 | 4b | 510 | 500 | 80-150 | 7 | 50 |
| 3c | 2aa | 1,765 | 1,000 | 26 | 5b | 860 | 1,000 | 80-150 | 6.5 | 50 |
| 4c | 4aa | 2,050 | 1,000 | 32 | 6b | 1,110 | 1,000 | 80-150 | 8 | 50 |
| 5c | 9aa | 2,380 | 1,000 | 45 | 7b | 2,110 | 2,000 | 80-150 | 7 | 50 |
| 6c | 10aa | 2,535 | 1,000 | 29 | 8b | 390 | 500 | 80-150 | 7 | 50 |
| 7c | 13aa | 1,890 | 1,000 | 24 | 9b | 470 | 500 | 80-150 | 7.5 | 50 |
| 8c | 15aa | 2,660 | 1,000 | 32 | 10b | 560 | 500 | 80-150 | 7 | 50 |
| 9c | 18aa | 2,913 | 1,000 | 36 | 11b | 650 | 500 | 80-150 | 7 | 50 |
| 10c | 19aa | 2,017 | 1,000 | 27 | 12b | 730 | 500 | 80-150 | 7 | 50 |
| 11c | 27aa | 1,272 | 1,000 | 17 | 13b | 420 | 500 | 80-150 | 8 | 50 |

TABLE V

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1c | 38aa | 2,700 | 5,436 | 2,718 | 8 |
| 2c | 1aa | 2,500 | 4,990 | 2,495 | 11 |
| 3c | 2aa | 2,600 | 5,250 | 2,625 | 11 |
| 4c | 4aa | 3,200 | 6,320 | 3,160 | 11 |
| 5c | 9aa | 4,500 | 8,980 | 4,490 | 11 |
| 6c | 10aa | 2,900 | 5,850 | 2,925 | 11 |
| 7c | 13aa | 2,400 | 4,720 | 2,360 | 11 |
| 8c | 15aa | 3,200 | 6,440 | 3,220 | 11 |
| 9c | 18aa | 3,600 | 7,120 | 3,563 | 11 |
| 10c | 19aa | 2,800 | 5,494 | 2,747 | 11 |
| 11c | 27aa | 1,700 | 3,384 | 1,692 | 8 |

PART 5

At the present time there are available a number of alkylene oxides, particularly ethylene oxide, or propylene oxide and butylene oxide, either as a single isomer or as a mixture of isomers. Glycide is available, or readily prepared. The same applies to methylglycide.

Oxyalkylation with any of the aforementioned alkylene oxides is comparatively simple in light of present day knowledge. In fact, it is stated briefly in U.S. Patent No. 2,636,038, dated April 21, 1953, to Brandner, in the following language: " . . . The compounds . . . are prepared by the addition reaction between alkylene oxides and substituted oxazolines of the group named hereinbefore. The addition reaction is advantageously carried out at elevated temperature and pressure and in the presence of an alkaline catalyst."

As to a more complete description of oxyalkylation procedure reference is made to U.S. Patent 2,629,706, dated February 24, 1953, to De Groote and Keiser. See particularly the subject matter which appears in column 7 of said patent.

Propylene oxide and butylene oxide react somewhat more slowly than ethylene oxide and may require a somewhat higher temperature, somewhat greater agitation, or an increased amount of alkaline catalyst, such as finely powdered sodium hydroxide or sodium methylate. If the product to be subjected to oxyalkylation is xylene-soluble or soluble in any one of a number of inert solvents, there is no particular difficulty involved. The same is true if the product is a liquid at oxyalkylation temperatures. If it is not soluble or a liquid then in some cases initial oxyalkylation can be accomplished by means of an alkylene carbonate, such as ethylene carbonate or propylene carbonate which has a solubility effect as well as acting as an oxyalkylation agent. As soon as a suitable product is obtained by the use of a carbonate further reaction can be completed with the oxide. An alternate procedure sometimes employed with insoluble materials is to reduce the products to an extremely finely ground powder and oxyalkylate during suspension using particularly vigorous agitation.

All these procedures have been described repeatedly in the literature and, as a matter of fact, suitable operational directions are available from any one of several makers of alkylene oxides.

*Example 1d*

Due to their ready availability, the bulk of the oxyalkylation derivatives were prepared from ethylene oxide, propylene oxide, butylene oxide, or a mixture of the same. Generally speaking, the autoclaves or oxyalkylators employed ranged from approximately 2 gallons in size to approximately 20 gallons in size. The general procedure was to start with a fairly small sample; for instance, approximately 2000 grams, of the product to be oxyalkylated and 1000 grams of a solvent such as xylene, or a high-boiling aromatic solvent, or the diethylether of ethyleneglycol, or a mixture of these solvents. Powdered caustic soda, or sodium methylate, were added as a catalyst in an amount generally not over 2%, and more catalyst was added if the amount dropped to ½% or less. Initial oxyalkylation generally started by adding 50% by weight, 100% by weight, 200% by weight, 300% by weight, 500% by weight, etc., until at least ten times as much oxide had been added, at least in some examples. Excellent compounds or suitable raw materials have been obtained by adding as much as 50 parts by weight of oxide to one part of the initial reactant. In some instances the same examples were repeated and then reacted with one or more oxides; for instance, in the table which follows there are examples where an oxyethylated product was oxypropylated subsequently, or vice-versa. Comparatively small samples, for instance, one to five grams, were taken at various stages and tested for emulsifiability factor and also for demulsifying effect on crude oil emulsions. The tabular data do not reflect the slight discrepancy due to sample withdrawal.

More specifically then, 15 pounds (6,500 grams) of the condensate previously identified as Example 7c, were mixed with an equal weight of solvent (being xylene in this series). The mixture was placed in a small autoclave together with one-half pound of finely powdered caustic soda, and stirred, and the temperature raised to The pressure during the oxyalkylation was about 10 to 15 ethylene oxide were added in approximately 15 minutes. The pressure during the oxylation was about 10 to 15 pounds per square inch. The resultant product was a fluid having a dark cast. Except for the withdrawal of a few grams for examination, the product was then subjected to further oxyalkylation with another 2.5 pounds of ethylene oxide and without the addition of any more catalyst or any more solvent.

Note what is said in regard to these examples and subsequent examples in the text immediately following, and in the tables.

A number of additional examples appear in tabular form in the five tables immediately following, to wit, Tables VI, VII, VIII, IX and X. These are self-explanatory, particularly in regard to the first three tables. The last two require a little more careful examination. This is due to an effort to condense the data and not burden the text with an unduly large volume of detail.

Due to the fact that various size quantities are used the ratios sometimes appear in grams or kilograms and sometimes in pounds. When pounds are used the designation "#" is included.

In Tables VI, VII and VIII successive stages of oxyalkylation are shown. Small samples of a few grams were withdrawn and tested for solubility and also for demulsification effectiveness. The withdrawal of such small samples was ignored. In some instances the example was repeated and used subsequently for reaction with one or more other oxides. In some instances the product so obtained in the first stage of oxyalkylation represented a comparatively large quantity and was subdivided perhaps into one-half or even a smaller fraction, and then this smaller fraction only subjected to oxyalkylation with another oxide. As previously noted, no further explanation is required in regard to the first three tables.

In the fourth table, Table IX, it is to be noted that Example 1g is derived from Example 8d. Referring to Example 8d it will be noted this was derived originally from oxyalkylation-susceptible compound Example 7c. In Example 8d, oxyalkylation-susceptible compound Example 7c had already been treated with ethylene oxide. Thus, in Table IX, although the oxyalkylation-susceptible compound is properly designated as Example 8d for the reason it is now the reactant subjected to oxypropylation, the oxyalkylation-susceptible compound as far as reference to weight goes (in this instance 7½ pounds) goes back to the original compound Example 7c. This is obvious, and is even more obvious for the reason that it is subsequently emphasized in connection with the weight ratio, as explained subsequently.

It will be noted also that in the fourth column in Table IX the oxide used is marked as indicated and in each instance the oxide employed in this second stage is shown, in two instances in Table IX being propylene oxide and in one instance being ethylene oxide.

Bearing in mind what is said in regard to Example 1g being derived from Example 8d, which in turn was derived from Example 7c plus ethylene oxide, it should be noted that this table does not, as far as the first four columns go, reflect the amount of oxide which was added in the initial or earlier stage. As previously noted, this does not cause confusion and, in fact, permits holding the data to a minimum in light of what is said next.

Referring now to columns seven, eight, nine and ten which are concerned with composition at the end, it will be noted that these data do take into consideration the amount of oxide added initially as well as the oxide during the second stage. Thus, although this shows the propylene oxide added it also shows the original ethylene oxide as representing the five-to-one weight ratio based on the oxyethylation of the first stage. This can be stated perhaps more simply in the following way: On initial examination the table shows that Example 1g was derived from Example 8d. As to the composition of Example 8d one need only note that in the seventh column it shows that 7½ pounds of propylene oxide were added and the weight ratio to the oxyalkylation-susceptible compound Example 7c was one-to-one, but it also shows that the weight ratio of the ethylene oxide at the same stage was five-to-one. Thus, without even checking back to a prior table it is obvious the initial material, Example 8d, subjected to a second oxyalkylation step, consisted of a product in which one part of the oxyalkylation-susceptible compound was combined with 5 pounds by weight of ethylene oxide, prior to oxypropylation.

All the data in Tables IX and X are presented in the same way. We find this is the most simple and concise tabular presentation that yet has been developed after a considerable series of experimentations, and reports in table form. This is true even where three oxides were employed as for instance in Example 1h, in Table X. Example 1h was obtained from Example 3g in Table IX. Example 3g, as indicated, was obtained by an oxypropylation of Example 1g, and Example 1g, as previously noted, was obtained from Example 8d. The preparation of Example 8d from Example 7c has been discussed in considerable detail in the previous text. Again it is to be noted that in the tables the ratios of the oxide to the initial product prior to oxyalkylation is shown so there is no question as to the composition of each example although considerable data have been presented in what is a comparatively condensed and readily understandable form.

Note what is said in regard to the color of the products in the tables. For most industrial purposes there is no objection to the color. The products can be decolorized by conventional procedure, using bleaching earths, filtering clays, charcoal, or the like. A trace or small amount of catalyst, if present, can be removed for most purposes by the mere addition of a comparable amount of hydrochloric acid or by any other suitable means.

TABLE VI

| Ex. No. | Composition before—Amount of OSC[1], catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC[1] grams | Oxide used EtO, grams | Catalyst, NaOH, grams | Xylene solvent grams | Oxide used grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1d | 7c | 15# | 0 | 0.5# | 15# | 2.5# | ¼ | | | 10-15 | 130-135 | ¼ | Dark thick liquid. |
| 2d | 1d | 15 | 2.5 | 0.5 | 15 | 5.0 | ⅓ | | | 10-15 | 130-135 | ¼ | Do. |
| 3d | 2d | 15 | 5.0 | 0.5 | 15 | 7.5 | ½ | | | 10-15 | 130-135 | ½ | Do. |
| 4d | 3d | 15 | 7.5 | 0.5 | 15 | 15.0 | 1.0 | | | 10-15 | 130-135 | ¾ | Viscous liquid. |
| 5d | 4d | 15 | 15.0 | 0.5 | 15 | 30.0 | 2.0 | | | 10-15 | 130-135 | 1¼ | Do. |
| 6d | 5d | 15 | 30.0 | 0.5 | 15 | 45.0 | 3.0 | | | 10-15 | 130-135 | 2 | Very viscous. |
| 7d | 6d | 15 | 45.0 | 0.5 | 15 | 60.0 | 4.0 | | | 10-15 | 130-135 | 2 | Do. |
| 8d | 7d | 15 | 60.0 | 0.5 | 15 | 75.0 | 5.0 | | | 10-15 | 130-135 | 2½ | Semi-solid. |
| 9d | 8c | 30 | 0 | 1.0 | 30 | 7.5 | ¼ | | | 10-15 | 130-135 | ¾ | Thick liquid. |
| 10d | 9d | 30 | 7.5 | 1.0 | 30 | 15.0 | ½ | | | 10-15 | 130-135 | ¾ | Do. |
| 11d | 10d | 30 | 15.0 | 1.0 | 30 | 30.0 | 1.0 | | | 10-15 | 130-135 | 1¼ | Viscous liquid. |
| 12d | 11d | 15 | 15.0 | 0.5 | 15 | 30.0 | 2.0 | | | 10-15 | 130-135 | 1½ | Do. |
| 13d | 12d | 15 | 30.0 | 0.5 | 15 | 45.0 | 3.0 | | | 10-15 | 130-135 | 2 | Very viscous. |
| 14d | 13d | 15 | 45.0 | 0.5 | 15 | 52.5 | 3.5 | | | 10-15 | 130-135 | 2½ | Do. |
| 15d | 14d | 15 | 52.5 | 0.5 | 15 | 60.0 | 4.0 | | | 10-15 | 130-135 | 2½ | Semi-solid. |

[1] Oxyalkylation-susceptible compound.
[2] In some instances weight change from gram basis to pound basis. Such change in unit is obvious.

TABLE VII

| Ex. No. | Composition before—Amount of OSC[1], catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC[1] grams | Oxide used PrO grams | Catalyst, NaOH, grams | Xylene solvent grams | Oxide used PrO grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1e | 3c | 25.0# | 0 | 2.5# | 25.0# | 50.0# | | 2.0 | | 10-15 | 130-135 | 6 | Dark liquid. |
| 2e | 1e | 12.5 | 25.0 | 1.25 | 12.5 | 50.0 | | 4.0 | | 10-15 | 130-135 | 2½ | Do. |
| 3e | 2e | 12.5 | 50.0 | 1.25 | 12.5 | 75.0 | | 6.0 | | 10-15 | 130-135 | 2½ | Do. |
| 4e | 3e | 6.25 | 37.5 | 0.625 | 6.25 | 50.0 | | 8.0 | | 10-15 | 130-135 | 2 | Do. |
| 5e | 4e | 6.25 | 50.5 | 0.625 | 6.25 | 75.0 | | 12.0 | | 10-15 | 130-135 | 3 | Do. |
| 6e | 5e | 6.25 | 75.0 | 0.625 | 6.25 | 87.5 | | 14.0 | | 10-15 | 130-135 | 3 | Do. |
| 7e | 6e | 3.0 | 42.0 | 0.3 | 3.0 | 54.0 | | 18.0 | | 10-15 | 130-135 | 2½ | Do. |
| 8e | 7e | 3.0 | 54.0 | 0.3 | 3.0 | 75.0 | | 25.0 | | 10-15 | 130-135 | 2½ | Do. |
| 9e | 4c | 20.0 | 0 | 2.0 | 20.0 | 60.0 | | 3.0 | | 10-15 | 130-135 | 3¼ | Do. |
| 10e | 9e | 15.0 | 45.0 | 1.5 | 15.0 | 70.0 | | 4.67 | | 10-15 | 130-135 | 6 | Do. |
| 11e | 10e | 10.0 | 46.67 | 1.0 | 10.0 | 60.0 | | 6.0 | | 10-15 | 130-135 | 2 | Do. |
| 12e | 11e | 10.0 | 60.0 | 1.0 | 10.0 | 80.0 | | 8.0 | | 10-15 | 130-135 | 1½ | Do. |
| 13e | 12e | 5.0 | 40.0 | 0.5 | 5.0 | 60.0 | | 12.0 | | 10-15 | 130-135 | 2 | Do. |
| 14e | 13e | 5.0 | 60.0 | 0.5 | 5.0 | 90.0 | | 18.0 | | 10-15 | 130-135 | 2½ | Do. |
| 15e | 14e | 2.5 | 45.0 | 0.25 | 2.5 | 62.0 | | 24.8 | | 10-15 | 130-135 | 3 | Do. |

[1] Oxyalkylation-susceptible compound.
[2] In some instances weights change from gram basis to pound basis. Such change in unit is obvious.

TABLE VIII

| Ex. No. | OSC¹ Ex. No. | OSC¹ grams | Oxide used, BuO, grams | Catalyst, NaOH, grams | Xylene solvent grams | Oxide used, BuO, grams² | Weight ratio EtO to oxyalkylation suscept. cmpd. | Weight ratio PrO to oxyalkylation suscept. cmpd. | Weight ratio BuO to oxyalkylation suscept. cmpd. | Max. pres., p.s.i. | Max. temp., °C | Time of reaction, hrs. | End product—Color and physical state |
|---|---|---|---|---|---|---|---|---|---|---|---|---|---|
| 1f | 2c | 10# | 0.0# | 1.0# | 10.0# | 10.0# | | | 1.0 | 20-35 | 130-145 | 2 | Dark viscous liquid. |
| 2f | 1f | 10.0 | 10.0 | 1.0 | 10.0 | 20.0 | | | 2.0 | 20-35 | 130-145 | 2½ | Do. |
| 3f | 2f | 10.0 | 20.0 | 1.0 | 10.0 | 30.0 | | | 3.0 | 20-35 | 130-145 | 3¼ | Do. |
| 4f | 3f | 10.0 | 30.0 | 1.0 | 10.0 | 40.0 | | | 4.0 | 20-35 | 130-145 | 3¼ | Do. |
| 5f | 4f | 10.0 | 40.0 | 1.0 | 10.0 | 50.0 | | | 5.0 | 20-35 | 130-145 | 3½ | Do. |
| 6f | 4c | 25.0 | 0.0 | 2.5 | 25.0 | 25.0 | | | 1.0 | 20-35 | 130-145 | 3 | Do. |
| 7f | 6f | 25.0 | 25.0 | 2.5 | 25.0 | 50.0 | | | 2.0 | 20-35 | 130-145 | 3 | Do. |
| 8f | 7f | 12.5 | 25.0 | 1.25 | 12.5 | 37.5 | | | 3.0 | 20-35 | 130-145 | 2½ | Do. |
| 9f | 8f | 12.5 | 37.5 | 1.25 | 12.5 | 50.0 | | | 4.0 | 20-35 | 130-145 | 2 | Do. |
| 10f | 9f | 12.5 | 50.0 | 1.25 | 12.5 | 75.0 | | | 6.0 | 20-35 | 130-145 | 3½ | Do. |
| 11f | 5c | 20.0 | 0.0 | 2.0 | 20.0 | 20.0 | | | 1.0 | 20-35 | 130-145 | 3½ | Do. |
| 12f | 11f | 20.0 | 20.0 | 2.0 | 20.0 | 40.0 | | | 2.0 | 20-35 | 130-145 | 4 | Do. |
| 13f | 12f | 20.0 | 40.0 | 2.0 | 20.0 | 60.0 | | | 3.0 | 20-35 | 130-145 | 3¾ | Do. |
| 14f | 13f | 10.0 | 30.0 | 1.0 | 10.0 | 50.0 | | | 5.0 | 20-35 | 130-145 | 3¾ | Do. |
| 15f | 14f | 10.0 | 50.0 | 1.0 | 10.0 | 75.0 | | | 7.0 | 20-35 | 130-145 | 4½ | Do. |

¹ Oxyalkylation-susceptible compound.
² In some instances weights change from gram basis to pound basis. Such change in unit is obvious.

TABLE IX

| Ex. No. | OSC¹ Ex. No. | OSC¹ grams | Oxide used, as indicated, grams | Catalyst, NaOH, grams | Xylene solvent grams | Oxide used, grams² | Weight ratio EtO to oxyalkylation suscept. cmpd.³ | Weight ratio PrO to oxyalkylation suscept. cmpd.³ | Weight ratio BuO to oxyalkylation suscept. cmpd.³ | Max. pres., p.s.i. | Max. temp., °C | Time of reaction, hrs. | End product—Color and physical state |
|---|---|---|---|---|---|---|---|---|---|---|---|---|---|
| 1g | 8d | 7.5# | 0#PrO | 0.75# | 7.5# | 7.5#PrO | 5.0 | 1.0 | | 10-15 | 130-135 | ½ | Semi-solid. |
| 2g | 1g | 7.5 | 7.5 | 0.75 | 7.5 | 15.0 | 5.0 | 2.0 | | 10-15 | 130-135 | ½ | Viscous liquid. |
| 3g | 2g | 7.5 | 15.0 | 0.75 | 7.5 | 37.5 | 5.0 | 5.0 | | 10-15 | 130-135 | 1¼ | Do. |
| 4g | 3g | 7.5 | 37.5 | 0.75 | 7.5 | 52.5 | 5.0 | 7.0 | | 10-15 | 130-135 | 2 | Do. |
| 5g | 4g | 7.5 | 26.25 | 0.375 | 3.75 | 56.25 | 5.0 | 15.0 | | 10-15 | 130-135 | 4 | Do. |
| 6g | 12e | 5.0 | 0#EtO | 0.5 | 5.0 | 10#EtO | 2.0 | 8.0 | | 10-15 | 130-135 | ½ | Dark thick liquid. |
| 7g | 6g | 5.0 | 10.0 | 0.5 | 5.0 | 20.0 | 4.0 | 8.0 | | 10-15 | 130-135 | ½ | Do. |
| 8g | 7g | 5.0 | 20.0 | 0.5 | 5.0 | 40.0 | 8.0 | 8.0 | | 10-15 | 130-135 | 1¼ | Do. |
| 9g | 8g | 5.0 | 40.0 | 0.5 | 5.0 | 50.0 | 10.0 | 8.0 | | 10-15 | 130-135 | 1 | Do. |
| 10g | 9g | 5.0 | 50.0 | 0.5 | 5.0 | 60.0 | 12.0 | 8.0 | | 10-15 | 130-135 | 1½ | Do. |
| 11g | 5f | 10.0 | 0#PrO | 1.0 | 10.0 | 30#PrO | | 3.0 | | 10-15 | 130-135 | 2 | Do. |
| 12g | 11g | 10.0 | 30.0 | 1.0 | 10.0 | 60.0 | | 6.0 | | 10-15 | 130-135 | 2¼ | Do. |
| 13g | 12g | 5.0 | 30.0 | 0.5 | 5.0 | 50.0 | | 10.0 | | 10-15 | 130-135 | 2¼ | Do. |
| 14g | 13g | 5.0 | 50.0 | 0.5 | 5.0 | 80.0 | | 16.0 | | 10-15 | 130-135 | 3¾ | Do. |
| 15g | 14g | 2.5 | 40.0 | 0.25 | 2.5 | 60.0 | | 24.0 | | 10-15 | 130-135 | 3½ | Do. |

¹ Oxyalkylation-susceptible compound.
² In some instances weights change from gram basis to pound basis. Such change in unit is obvious.
³ Weight ratio based on original oxyalkylation-susceptible compounds prior to any oxyalkylation.

TABLE X

| Ex. No. | OSC¹ Ex. No. | OSC¹ grams | Oxide used, as indicated, grams | Catalyst, NaOH, grams | Xylene solvent grams | Oxide used, grams² | Weight ratio EtO to oxyalkylation suscept. cmpd.³ | Weight ratio PrO to oxyalkylation suscept. cmpd.³ | Weight ratio BuO to oxyalkylation suscept. cmpd.³ | Max. pres., p.s.i. | Max. temp., °C | Time of reaction, hrs. | End product—Color and physical state |
|---|---|---|---|---|---|---|---|---|---|---|---|---|---|
| 1h | 3g | 750 | 0BuO | 75 | 750 | 375BuO | 5 | 5 | 0.5 | 60-65 | 130-145 | 2 | Viscous liquid. |
| 2h | 1h | 750 | 375 | 75 | 750 | 750 | 5 | 5 | 1.0 | 60-65 | 130-145 | 2½ | Do. |
| 3h | 2h | 750 | 750 | 75 | 750 | 1,500 | 5 | 5 | 4.0 | 60-65 | 130-145 | 5 | Do. |
| 4h | 3h | 375 | 750 | 37.5 | 375 | 1,500 | 5 | 5 | 4.0 | 60-65 | 130-145 | 3¾ | Do. |
| 5h | 4h | 375 | 1,500 | 37.5 | 375 | 1,875 | 5 | 5 | 5.0 | 60-65 | 130-145 | 4½ | Do. |
| 6h | 10g | 500 | 0BuO | 50 | 500 | 500BuO | 12.0 | 8.0 | 1.0 | 60-65 | 130-145 | 2¾ | Dark liquid. |
| 7h | 6h | 250 | 250 | 25 | 250 | 500BuO | 12.0 | 8.0 | 2.0 | 60-65 | 130-145 | 2 | Do. |
| 8h | 7h | 250 | 500 | 25 | 250 | 750 | 12.0 | 8.0 | 3.0 | 60-65 | 130-145 | 3 | Do. |
| 9h | 8g | 125 | 375 | 12.5 | 125 | 625 | 12.0 | 8.0 | 5.0 | 60-65 | 130-145 | 4 | Do. |
| 10h | 9h | 125 | 625 | 12.5 | 125 | 1,000 | 12.0 | 8.0 | 8.0 | 60-65 | 130-145 | 5 | Do. |
| 11h | 15g | 250 | 0EtO | 25 | 250 | 25EtO | 1.0 | 24.0 | 5.0 | 10-15 | 125-130 | 1 | Do. |
| 12h | 11h | 250 | 250 | 25 | 250 | 500 | 2.0 | 24.0 | 5.0 | 10-15 | 125-130 | 1½ | Do. |
| 13h | 12h | 125 | 250 | 12.5 | 125 | 500 | 4.0 | 24.0 | 5.0 | 10-15 | 125-130 | 1¾ | Do. |
| 14h | 13h | 125 | 500 | 12.5 | 125 | 1,000 | 8.0 | 24.0 | 5.0 | 10-15 | 125-130 | 3½ | Do. |
| 15h | 14h | 125 | 1,000 | 12.5 | 125 | 1,500 | 12.0 | 24.0 | 5.0 | 10-15 | 125-130 | 4 | Do. |

¹ Oxyalkylation-susceptible compound.
² In some instances weights change from gram basis to pound basis. Such change in unit is obvious.
³ Weight ratio based on original oxyalkylation-susceptible compounds prior to any oxyalkylation.

PART 6

As to the use of conventional demulsifying agents reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 6d, herein described.

PART 7

The intermediate resinous products described in Part 3, preceding, can be oxyalkylated and employed for various purposes and particularly for the resolution of petroleum emulsions of the water-in-oil type as described in detail in Part 5, immediately preceding.

Such resinous products, however, without being subjected to oxyalkylation can serve for other uses as described in U.S. Patent No. 2,610,955, dated September 16, 1952, to De Groote and Keiser. Furthermore, such resinous materials can be reacted with alkylene imines, such as ethylene imine or propylene imine, to produce cation-active materials. Instead of an imine, one may employ what is a somewhat equivalent material, to wit, a dialkylamino-epoxypropane of the structure

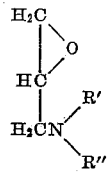

wherein R' and R" are alkyl groups.

It is not necessary to point out that after reaction with a reactant of the kind described which introduces a basic nitrogen atom the resultant product can then be subjected to the oxyalkylation procedures described in detail in Part 5, preceding.

Referring now to the use of the oxyalkylated products obtained in the manner described in Part 4, preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Not only do these oxyalkylated derivatives have their utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

Comparable compounds which can serve the various purposes previously enumerated, in both the resinous stage and the oxyalkylated stage, are obtained from another class of resins, i.e., those in which the phenolic nuclei are separated by a radical having at least a 3-carbon atom chain and are obtained, not by the use of a single aldehyde but by the use of formaldehyde, in combination with a carbonyl compound selected from the class of aldehydes and ketones in which there is an alpha hydrogen atom available as in the case of acetaldehyde or acetone. Such resins almost invariably involve the use of a basic catalyst. Such bridge radicals between phenolic nuclei have either hydroxyl radicals or carbonyl radicals, or both, and are invariably oxyalkylation-susceptible and may also enter into more complicated reactants with basic secondary amines. The bridge radical in the initial resin has distinct hydrophile character. Such resins or compounds which can be converted readily into such resins are described in the following patents. Such analogous compounds are not included as part of the instant invention.

| U.S. Patent No. | Dated | Inventor |
|---|---|---|
| 2,191,802 | Feb. 27, 1940 | Novotny et al. |
| 2,448,664 | Sept. 27, 1948 | Fife et al. |
| 2,538,883 | Jan. 23, 1951 | Schrimpe. |
| 2,538,884 | ----do---- | Do. |
| 2,545,559 | Mar. 20, 1951 | Do. |
| 2,570,389 | Oct. 9, 1951 | Do. |

Having thus described our invention, what we claim as new and desire to obtain by Letters Patent is:

1. Synthetic hydrophile products; said synthetic hydrophile products being the monoepoxide oxyalkylation derivatives of the reaction products obtained by condensing (A) a fusible, organic solvent-soluble, water insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

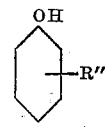

in which R" is selected from the group consisting of phenyl and saturated hydrocarbon radicals having at least 4 and not more than 18 carbon atoms and substituted in the 2, 4, 6 position; and (B) polyepoxides of the structure

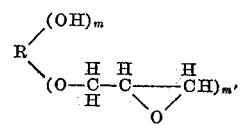

in which $m$ is a small whole number not over 4 and including 0, and $m'$ is a small whole number varying from 2 to 4, and R is the unmodified residual radical of the intermediate polyol

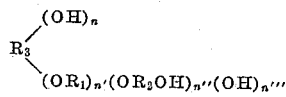

in which $n$ is a small whole number varying from 0 to 2, $OR_1$ is selected from the class consisting of oxyethylene radicals, oxypropylene radicals, and oxybutylene radicals; $OR_2OH$ is selected from the class consisting of oxy(hydroxy)propylene radicals and oxy(hydroxy)butylene radicals; $n'$ is a numeral varying from 2 to 200; $n''$ is a numeral varying from 0 to 8 and $n'''$ is a numeral varying from 2 to 4; with the proviso that the sum of $n$ and $n''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4; with the proviso that the ratio of reactant (A) to reactant (B) be in the proportion of approximately 2 moles of (A) to 1 mole of (B); with the further proviso that said reactive compounds (A) and (B) be members of the class consisting of nonthermosetting organic solvent-soluble liquids and solids melting below the point of pyrolysis; and with the final proviso that the reaction product be a member of the class of solvent-soluble liquids and solids melting below the point of pyrolysis; and said condensation between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methylglycide.

2. Synthetic hydrophile products; said synthetic hydrophile products being the monoepoxide oxyalkylation derivatives of the reaction products obtained by condensing (A) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

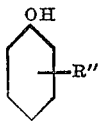

in which R″ is selected from the group consisting of phenyl and saturated hydrocarbon radicals having at least 4 and not more than 18 carbon atoms and substituted in the 2, 4, 6 position; and (B) polyepoxides of the structure

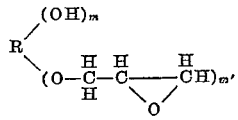

in which $m$ is a small whole number not over 4 and including 0, and $m'$ is a small whole number varying from 2 to 4, and R is the unmodified residual radical of the intermediate polyol

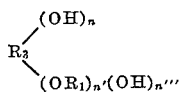

in which $n$ is a small whole number varying from 0 to 2, $OR_1$ is selected from the class consisting of oxyethylene radicals, oxypropylene radicals, and oxybutylene radicals; $n'$ is a numeral varying from 2 to 200; and $n'''$ is a numeral varying from 2 to 4; with the proviso that the sum of $n$ and $n'''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4; with the proviso that the ratio of reactant (A) to reactant (B) be in the proportion of approximately 2 moles of (A) to 1 mole of (B); with the further proviso that said reactive compounds (A) and (B) be members of the class consisting of nonthermosetting organic solvent-soluble liquids and solids melting below the point of pyrolysis; and with the final proviso that the reaction product be a member of the class of solvent-soluble liquids and solids melting below the point of pyrolysis; and said condensation between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methylglycide.

3. Synthetic hydrophile products; said synthetic hydrophile products being the monoepoxide oxyalkylation derivatives of the reaction products obtained by condensing (A) a fusible, organic solvent-soluble, water insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

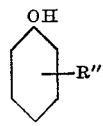

in which R″ is selected from the group consisting of phenyl and saturated hydrocarbon radicals having at least 4 and not more than 18 carbon atoms and substituted in the 2, 4, 6 position; and (B) polyepoxides of the structure

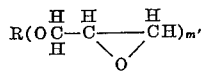

in which $m'$ is a small whole number varying from 2 to 4, and R is the unmodified residual radical of the intermediate polyol

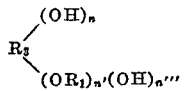

in which $n$ is a small whole number varying from 0 to 2, $OR_1$ is selected from the class consisting of oxyethylene radicals, oxypropylene radicals, and oxybutylene radicals; $n'$ is a numeral varying from 2 to 200; and $n'''$ is a numeral varying from 2 to 4; with the proviso that the sum of $n$ and $n'''$ is not over 4; with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory polyol $R_3(OH)_{n_4}$ in which $n_4$ is a small whole number varying from 2 to 4; with the proviso that the ratio of reactant (A) to reactant (B) be in the proportion of approximately 2 moles of (A) to 1 mole of (B); with the further proviso that said reactive compounds (A) and (B) be members of the class consisting of nonthermosetting organic solvent-soluble liquids and solids melting below the point of pyrolysis; and with the final proviso that the reaction product be a member of the class of solvent-soluble liquids and solids melting below the point of pyrolysis; and said condensation between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methylglycide.

4. Synthetic hydrophile products; said synthetic hydrophile products being the monoepoxide oxyalkylation derivatives of the reaction products obtained by condensing (A) a fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

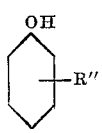

in which R″ is selected from the group consisting of phenyl and saturated hydrocarbon radicals having at least 4 and not more than 18 carbon atoms and substituted in the 2, 4, 6 position; and (B) diepoxides of the structure

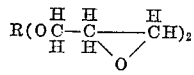

in which R is the unmodified residual radical of the intermediate diol

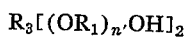

in which $OR_1$ is selected from the class consisting of oxyethylene radicals, oxypropylene radicals, and oxybutylene radicals; with the proviso that $n'$ is a numeral varying from 100 to 200, and with the proviso that the radical $R_3$ be free from any radical having at least 5 uninterrupted carbon atoms and consist essentially of a polyoxyalkylene chain containing sufficient alkylene groups having 3 and 4 carbon atoms to impart water insolubility and hydrophobe solvent solubility to the initial precursory diol $R_3(OH)_2$; with the proviso that the ratio of reactant (A) to reactant (B) be in the proportion of approximately 2 moles of (A) to 1 mole of (B); with the further proviso that said reactive compounds (A) and (B) be members of the class consisting of non-thermosetting organic solvent-soluble liquids and solids melting below the point of pyrolysis; and with the final proviso that the reaction product be a member of the class of solvent-soluble liquids and solids melting below the point of pyrolysis; and said condensation between (A) and (B) being conducted below the pyrolytic point of the reactants and the resultants of reaction; followed by an oxyalkylation step by means of an alpha-beta alkylene monoepoxide having not more than 4 carbon atoms and selected from the class consisting of ethylene oxide, propylene oxide, butylene oxide, glycide and methylglycide.

5. The product of claim 4 with the proviso that the majority of the occurrences of $OR_1$ are oxypropylene radicals and that R″ has at least 4 and not over 14 carbon atoms and is substituted in the para position and the aldehyde is formaldehyde, and with the further proviso that the original resin has not over 6 phenolic nuclei.

No references cited.